(12) United States Patent
Teraoka et al.

(10) Patent No.: US 10,807,239 B2
(45) Date of Patent: Oct. 20, 2020

(54) APPARATUS, NON-TRANSITORY COMPUTER READABLE MEDIUM, AND METHOD FOR SOLDERING

(71) Applicant: Hakko Corporation, Osaka-shi, Osaka (JP)

(72) Inventors: Yoshitomo Teraoka, Osaka (JP); Satoshi Manda, Osaka (JP)

(73) Assignee: HAKKO CORPORATION, Osaka (JP)

( * ) Notice: Subject to any disclaimer, the term of this patent is extended or adjusted under 35 U.S.C. 154(b) by 70 days.

(21) Appl. No.: 16/143,116

(22) Filed: Sep. 26, 2018

(65) Prior Publication Data

US 2019/0099885 A1    Apr. 4, 2019

Related U.S. Application Data

(60) Provisional application No. 62/566,653, filed on Oct. 2, 2017.

(30) Foreign Application Priority Data

Nov. 30, 2017    (JP) .................................. 2017-230235

(51) Int. Cl.
*B23K 1/16* (2006.01)
*B25J 11/00* (2006.01)
(Continued)

(52) U.S. Cl.
CPC ........... *B25J 9/1664* (2013.01); *B23K 1/0016* (2013.01); *B23K 1/16* (2013.01); *B23K 1/19* (2013.01);
(Continued)

(58) Field of Classification Search
CPC .......... B23K 1/0016; B23K 1/16; B23K 1/19; B23K 1/20; B23K 2101/42; B23K 3/02;
(Continued)

(56) References Cited

U.S. PATENT DOCUMENTS 6,531,675 B2 * 3/2003 Faitel ..................... B23K 26/02
219/121.63
9,104,195 B2 * 8/2015 Daniel ................. B23K 9/0953
(Continued)

FOREIGN PATENT DOCUMENTS

JP    2000-075912    *    3/2000

*Primary Examiner* — Abdelmoniem I Elamin
(74) *Attorney, Agent, or Firm* — Squire Patton Boggs (US) LLP (57) ABSTRACT

A soldering apparatus is provided with a soldering iron for soldering with a tip, a driving portion for moving the soldering iron, a storage portion that stores position information indicating a soldering position and identification information associated each other, a reading portion that reads target identification information attached to the work target, an acquiring portion that acquires position information in the storage portion matching the target identification information read by the reading portion, and a process control portion for controlling the driving portion and the soldering iron so as to perform soldering at the position indicated by the position information acquired by the acquiring portion.

12 Claims, 8 Drawing Sheets

(51) Int. Cl.
*B25J 9/16* (2006.01)
*B23K 3/06* (2006.01)
*B23K 1/19* (2006.01)
*B23K 1/20* (2006.01)
*B23K 3/08* (2006.01)
*B23K 1/00* (2006.01)
*B23K 3/02* (2006.01)
*H04B 1/06* (2006.01)
*B23K 101/42* (2006.01)

(52) U.S. Cl.
CPC .................. *B23K 1/20* (2013.01); *B23K 3/02* (2013.01); *B23K 3/063* (2013.01); *B23K 3/0615* (2013.01); *B23K 3/08* (2013.01); *B25J 11/005* (2013.01); *B23K 2101/42* (2018.08); *H04B 1/06* (2013.01)

(58) Field of Classification Search
CPC ........ B23K 3/0615; B23K 3/063; B23K 3/08; B25J 11/005; B25J 9/1664; H04B 1/06
See application file for complete search history.

(56) References Cited

U.S. PATENT DOCUMENTS

| | | | |
|---|---|---|---|
| 2014/0263227 A1* | 9/2014 | Daniel | B23K 9/0956 219/130.01 |
| 2017/0032281 A1* | 2/2017 | Hsu | B23K 9/0953 |
| 2017/0255186 A1* | 9/2017 | Ryznar | G05B 19/418 |
| 2018/0304392 A1* | 10/2018 | Daniel | B23K 9/0956 |

* cited by examiner

Soldering Instructions

| Identification information | Sequence | Process class | Position class | Position | | | Orientation | Condition | ... |
|---|---|---|---|---|---|---|---|---|---|
| | | | | X | Y | Z | θ | | |
| PLxxx1A | 1 | Point soldering | End point | x11 | y11 | z11 | θ11 | Condition information 11 | ... |
| | 2 | Drag soldering | Start point | x121 | y121 | z12 | θ12 | Condition information 12 | ... |
| | | | End point | x122 | y122 | z12 | θ12 | | ... |
| | ... | ... | ... | ... | ... | ... | ... | ... | ... |
| PLxxx2A | 1 | Point soldering | End point | x21 | y21 | z21 | θ21 | Condition information 21 | ... |
| | ... | ... | ... | ... | ... | ... | ... | ... | ... |
| ... | ... | ... | ... | ... | ... | ... | ... | ... | ... |

| P.W.B. Information A1 | | | | | | | | |
|---|---|---|---|---|---|---|---|---|
| PLxxx1A | Bar code B0 | | New B1 | | Read B2 | Save B3 | Run B4 | Close B5 |
| Sequence | Process class | Position class | Position Information A2 | | | Orientation | Condition | |
| | | | X | Y | Z | θ | | |
| 1 | Point soldering | End point | x11 | y11 | z11 | θ11 | Condition information 1 | |
| 2 | Drag soldering | Start point | x121 | y121 | z121 | θ12 | Condition information 2 | |
| | | End point | x122 | y122 | z122 | θ12 | | |
| 3 | ... | ... | ... | ... | ... | ... | ... | |
| 4 | ... | ... | ... | ... | ... | ... | ... | |
| 5 | ... | ... | ... | ... | ... | ... | ... | |
| ... | ... | ... | ... | ... | ... | ... | ... | |

W1

APPARATUS, NON-TRANSITORY COMPUTER READABLE MEDIUM, AND METHOD FOR SOLDERING

CROSS-REFERENCE TO RELATED APPLICATIONS

This application claims the benefit of Provisional Application No. 62/566,653, filed Oct. 2, 2017, which is incorporated herein by reference. This application claims the benefit of Japanese Application No. 2017-230235, filed Nov. 30, 2017, which is incorporated herein by reference.

TECHNICAL FIELD

The present invention relates to a soldering apparatus, a computer readable medium storing instructions for controlling a soldering apparatus, and a soldering method.

BACKGROUND

A technique of controlling a robot so as to perform soldering at a plurality of positions on a soldering target on a substrate is well known. For example, patent document 1 describes a file which is stored in advance and includes data that defines coordinates for each point of soldering, the moving speed and acceleration of the soldering iron to each point, and the soldering conditions to be performed at each point. The data stored in the file is referred to as "teaching data." Further, at the time of soldering work, the robot is controlled so that soldering is performed to each point according to teaching data of a file designated by a user using a mouse.

Patent Document 1: Japanese Patent Publication JP 2000-75912

In the above-described prior art, soldering can be performed at a point defined in the teaching data included in a previously stored file. However, there may be many different files. If the user designates the wrong file, soldering would be performed at an improper position on a soldering target.

There is a need to address the above-discussed circumstance. There is also a continuing need to provide a soldering apparatus capable of performing soldering at an appropriate position of a soldering target.

SUMMARY

Briefly and in general terms, the present invention is directed to a soldering apparatus, non-transitory computer readable for soldering, and a soldering method for soldering.

In certain aspects, a soldering apparatus comprises: a soldering iron comprising a soldering tip for soldering; a driving portion coupled to and configured to move the soldering iron relative to a work target; a storage portion configured to store position information indicating a position for soldering and identification information, the position information and the identification information stored in association with each other; a reading portion configured to read target identification information disposed on the work target, the target identification information being read by the reading portion after the position information and the identification information are stored by the storage portion; an acquiring portion in communication with the storage portion, the acquiring portion configured to match the target identification information read by the reading portion to the identification information stored in the storage portion, and configured to acquire from the storage portion the position information associated with the identification information that was matched to the target identification information; and a process control portion in communication with the driving portion and the soldering iron, the process control portion configured to control the driving portion and the soldering iron so that soldering is performed at the position indicated by the position information acquired by the acquiring portion.

In certain aspects, a non-transitory computer readable medium is for a soldering apparatus comprising a soldering iron, a driving portion, a storage portion, a reading portion, and a controller, the non-transitory computer readable medium storing instructions. When executed by the controller, the instructions cause the soldering apparatus to perform a soldering method comprising: storing, in the storage portion, position information indicating a position for soldering and identification information, the position information and the identification information stored in association with each other; reading, by the reading portion, target identification information disposed on a work target, the reading performed after the position information and the identification information are stored in the storage portion; matching, by the controller, the target identification information read by the reading portion to the identification information stored in the storage portion; acquiring, by the controller, the position information stored in the storage portion in association with the identification information that was matched to the target identification information; and controlling, by the controller, the driving portion and the soldering iron so that soldering is performed at the position indicated by the acquired position information.

In certain aspects, a method is for a soldering apparatus comprising a soldering iron, a driving portion, a storage portion, a reading portion, and a controller. The method comprises: storing, in the storage portion, position information indicating a position for soldering and identification information, the position information and the identification information stored in association with each other; reading, by the reading portion, target identification information disposed on a work target, the reading performed after the position information and the identification information are stored in the storage portion; matching, by the controller, the target identification information read by the reading portion to the identification information stored in the storage portion; acquiring, by the controller, the position information stored in the storage portion in association with the identification information that was matched to the target identification information; and controlling, by the controller, the driving portion and the soldering iron so that soldering is performed at the position indicated by the acquired position information.

In aspects, the reading portion reads the target identification information attached to the work target, and the acquiring portion acquires the position information in the storage portion in association with the identification information matching the target identification information that was read. Then, the tip of the soldering iron is moved to the position indicated by the acquired position information, and soldering is performed by the soldering iron.

Since the target identification information is directly read from the work target, the acquiring portion can avoid acquiring incorrect position information. As a result, soldering at the wrong position can be avoided.

In aspects, the reading portion is configured to be freely movable by a user.

If the reading portion were fixed at a predetermined position and not movable relative to a work target, it may be difficult, if not impossible, to read the target identification information on certain locations on the work target. This issue is addressed by a reading portion that is freely movable by the user relative to the work target.

In aspects, the target identification information is represented by a barcode on the work target.

In aspects, the tip of the soldering iron is moved to the position represented by the position information associated with the target identification information represented by the barcode attached to the work target. This helps to ensure that soldering is performed at the appropriate position on the work target.

In aspects, the target identification information is represented by a two-dimensional code.

In aspects, the tip of the soldering iron is moved to the position indicated by the position information associated with the target identification information represented by the two-dimensional code attached to the work target. This helps to ensure that soldering is performed at the appropriate position on the work target.

In aspects, the information processing apparatus may further include a receiving portion that receives an input of the position information and the identification information. The storage portion stores the identification information and the position information received by the receiving portion in association with each other.

The identification information and position information that were input can be newly stored in the storage portion in association with each other.

In aspects, the receiving portion receives as input the target identification information read by the reading portion.

The target identification information read by the reading portion and input for position information are stored in the storage portion. The use of the reading portion avoids errors that may occur with manual entry of target identification information by the user.

The storage portion may store condition information in association with the position information. The condition information represents the soldering condition to be performed at the position indicated by the position information. The process control portion performs the soldering according to the condition indicated by the condition information acquired by the acquiring portion. Control of the driving portion and the soldering iron is performed so that soldering is performed at the position indicated by the position information acquired by the acquiring portion.

In aspects, the reading portion reads the target identification information attached to the work target to be soldered. The acquiring portion acquires position information stored in the storage portion in association with the identification information that matches the target identification information that was read. The acquiring portion acquires the condition information associated with the acquired position information. Then, the tip of the soldering iron is moved to the position indicated by the acquired position information, and soldering is performed by the tip according to the condition indicated by the acquired condition information.

By using the reading portion to read the target identification information directly from work target, the acquiring portion acquires the appropriate position information and condition information for the work target. This helps to avoid soldering errors.

The features and advantages of the invention will be more readily understood from the following detailed description which should be read in conjunction with the accompanying drawings.

DETAILED DESCRIPTION

The following description is provided with reference to the drawings. The same reference numerals are used for like elements among the several figures.

(Functional Configuration)

Figure 1:
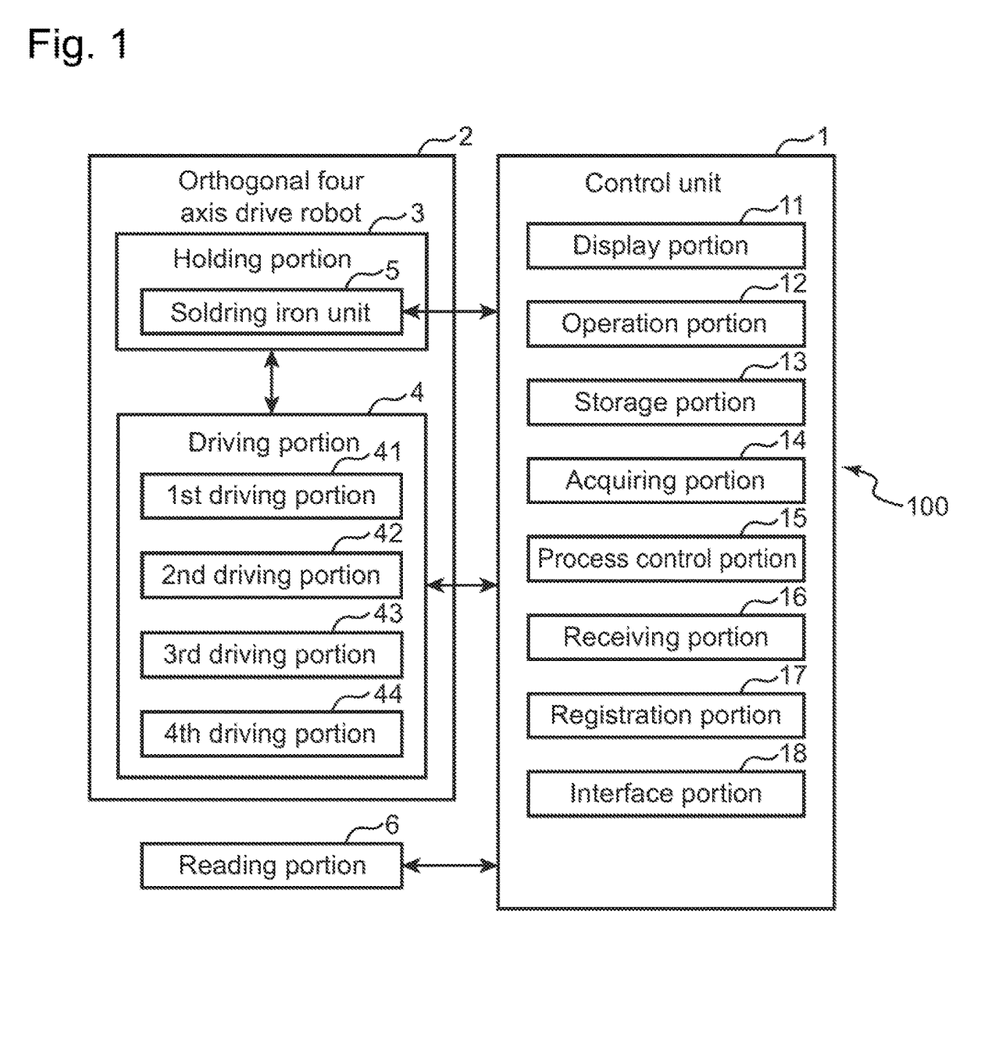
FIG. 1 is a block diagram showing an example functional configuration of a soldering apparatus.
Figure 2:
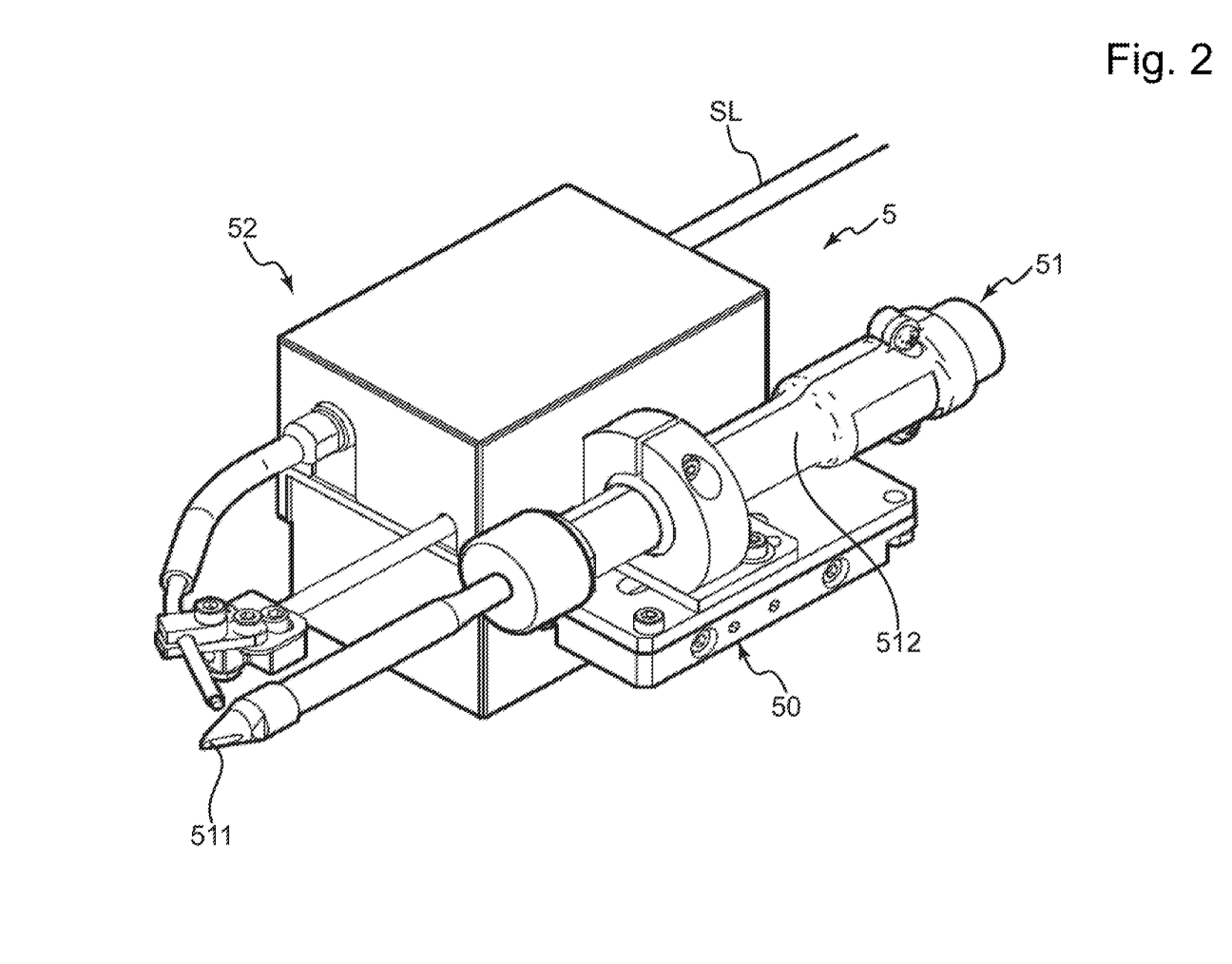
FIG. 2 is a perspective view of a soldering assembly.
Figure 3:
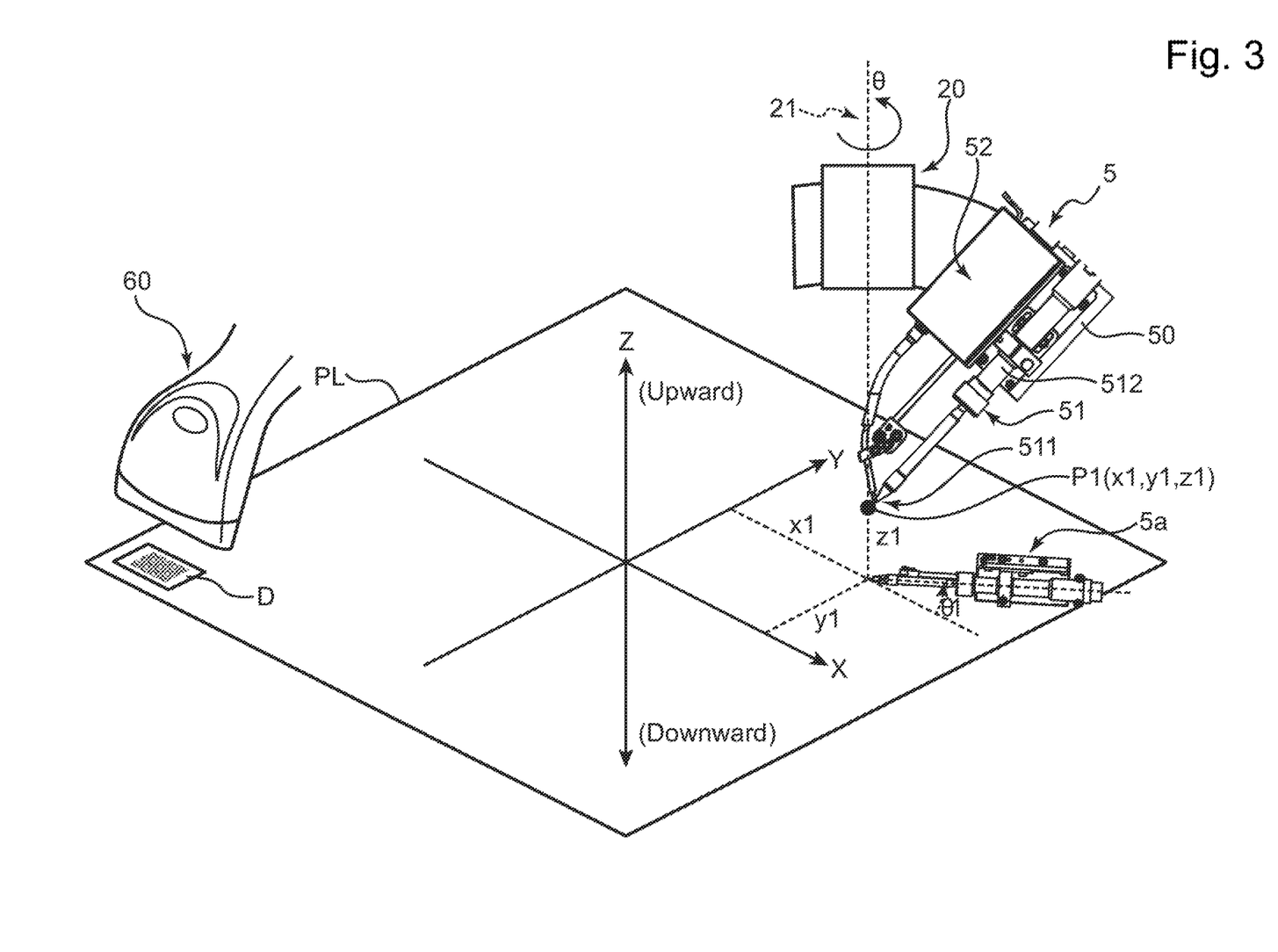
FIG. 3 is a diagram showing a relationship between a substrate surface of a work target and three-dimensional coordinates.

FIG. 1 is a block diagram showing an example of the functional configuration of the soldering apparatus 100. FIG. 2 is a perspective view of the soldering assembly 5. FIG. 3 is a diagram showing the relationship between the surface of the printed wiring board PL and three-dimensional coordinates.

As shown in FIG. 1, the soldering apparatus 100 includes an orthogonal four-axis drive robot 2, a reading portion 6, and a control unit 1. The orthogonal four-axis drive robot 2 includes a holding portion 3 and a driving portion 4.

The holding portion 3 holds the soldering assembly 5. Specifically, the holding portion 3 is in the form of an arm 20 shown in FIG. 3.

As shown in FIGS. 2 and 3, the soldering assembly 5 includes a base 50 fixed to the arm 20, a soldering iron 51 connected to the base 50, and a solder supplying mechanism 52.

The soldering iron 51 comprises a tip 155 and a coil heater formed of a metal wire material. The coil heater is incorporated in a built-in heater integrated type, which is inserted in a main body 512 of the soldering iron 51. Under the control of the control unit 1, the coil heater heats the tip 511 to a predetermined temperature at which the solder SL can be melted.

The solder supply mechanism 52 is a known mechanism capable of feeding out the solder SL from a reel (not shown). Under the control of the control unit 1, the solder supply mechanism 52 supplies solder SL of an amount instructed by the control unit 1 to the tip 511. Thus, the solder SL melted by the tip 511 of the soldering iron 51 is soldered so as to adhere to the position where the tip 511 is located.

The soldering iron 51 and the solder supply mechanism 52 move together in accordance with the movement of the base 50 fixed to the arm 20 (holding portion 3). Further specific configurations of the soldering iron 51 and the solder supply mechanism 52 are well known, so that their description will be omitted. The soldering iron 51 may have a configuration other than that described herein.

As shown in FIG. 3, by moving the arm 20 (the holding portion 3) under the control of the control unit 1, the driving portion 4 moves the tip 511 of the soldering iron 51 connected to the base 50 to the three dimensional predetermined point specified by three-dimensional coordinates (for example, P1 (x1, y1, z1)).

The three-dimensional coordinates are defined in three axes: Y, Y, and Z. The X axis and Y axis are orthogonal to each other along a plane, such as the surface of the printed wiring board PL (a work target) to be soldered. The Z axis extends in a direction perpendicular to the plane. Hereinafter, the plane is assumed to be the surface of the printed wiring board PL. However, the plane is not limited to the surface of the printed wiring board PL, but may be the surface of an installation base or mounting table (not shown) for carrying the printed wiring board PL. Also, the direction along the X axis is referred to as the X axis direction, the direction along the Y axis is referred to as the Y axis direction, and the direction along the Z axis is referred to as the Z axis direction. The direction away from the surface of the printed wiring board PL along the Z axis is referred to as upward, and the opposite direction is referred to as downward. Also, the value of the Z coordinate becomes larger in the upward direction and becomes smaller in the downward direction.

The soldering iron 51 is connected to the base 50 and the base 50 is fixed to the arm 20 so that the tip 511 is on the extension line of the rotation axis 21 of the arm 20 extending in the Z axis direction. The driving portion 4 rotates the arm 20 around the rotation axis 21 in the θ direction (counterclockwise), thereby rotating the soldering iron 51 in the θ direction about the tip 511. During rotation, the tip 511 remains on the rotation axis 21. In FIG. 3, reference numeral 5a represents an imaginary projection of soldering assembly 5 onto the surface of the printed wiring board PL. As indicated on the imaginary projection, the driving portion 4 has rotated the soldering iron 51 in the θ direction from the X-axis direction by the angle "θ1" about the tip 511.

The driving portion 4 comprises a first driving portion 41, a second driving portion 42, a third driving portion 43, and a fourth driving portion 44.

The first driving portion 41 moves the tip 511 along the X axis up to the position of the X coordinate (example: x1) specified by the process control portion 15 described later. The first driving portion 41 may comprise a driving motor that moves the arm 20 along the X axis. The first driving portion 41 may comprise a driving motor that moves a mounting table (not shown) for placing the printed wiring board PL along the X axis.

The second driving portion 42 moves the tip 511 along the Y axis up to the position of the Y coordinate (example: y1) specified by the process control portion 15 described later. The second driving portion 42 may comprise a driving motor that moves the arm 20 along the Y axis. The second driving portion 42 may comprise a driving motor for moving the mounting table (not shown) for placing the printed wiring board PL along the Y axis.

The third driving portion 43 moves the tip 511 along the Z axis to the position of the Z coordinate (example: z1) specified by the process control portion 15 described later. The third driving portion 43 may comprise a driving motor that moves the arm 20 along the Z axis.

The fourth driving portion 44 is configured to rotate the soldering iron 51 in the θ direction about the tip 51, so that the angle formed by the center axis of the soldering iron 51 in the θ direction (counterclockwise) with respect to the X axis direction is set to an angle (example: θ1) specified by the process control portion 15. Hereinafter, the angle formed by the central axis of the soldering iron 51 in the θ direction with respect to the X-axis direction is referred to as the orientation of the soldering iron 51. Also, rotating the soldering iron 51 in the θ direction about the tip 511 so that the orientation of the soldering iron 51 becomes the angle "θx" is referred to as adjusting the orientation of the soldering iron 51 to the angle "θx." The fourth driving portion 44 may comprise a driving motor that rotates the arm 20 in the θ direction around the rotation axis 21.

The reading portion 6 reads the identification information of the work target attached to the work target. As used herein, the term "target identification information" refers to the identification information on the work target. In the following examples, the work target is a printed wiring board PL, although other types of work targets are possible. The reading portion 6 may be a bar code reader 60 shown in FIG. 3, for example. The barcode reader 60 is connected to the control unit 1 via a communication cable, and is configured to be capable of wired communication with the control unit 1. The barcode reader 60 is configured to be freely movable by the user within the range of the length of the communication cable. The barcode reader 60 reads the target identification information of the printed wiring board PL represented by the barcode D adhered or printed directly on the surface of the printed wiring board PL and transmits the read target identification information to the control unit 1. The bar code D may be pasted or printed on a case that houses the printed wiring board PL, a packaging material for packaging the printed wiring board PL, or the like—in which case the bar code D is indirectly on the printed wiring board PL (the work target). As used herein, the phrase "target identification information disposed on a work target" means that the target information is directly or indirectly on the work target.

Further, the barcode reader 60 may be configured to be capable of wireless communication with the control unit 1. In this case, the barcode reader 60 is freely movable by the user in a wider range. Further, a two-dimensional code such as QR code (registered trademark) or the like representing the target identification information of the printed wiring board PL may be attached to the printed wiring board PL. In this case, the reading portion 6 may be further provided with a two-dimensional code reader capable of wired or wireless communication with the control unit 1.

Since the reading portion 6 is configured to be freely movable by the user, even when the target identification information of the printed wiring board PL is attached to a position difficult to read by a reading portion fixed at a predetermined position, the reading portion 6 can be moved to the position where the target identification information can be read and the reading portion 6 can read the target identification information.

Instead of an optical bar code reader, the reading portion 6 may be an RFID reader or other type of device capable of reading a machine-readable code on the work target in order to identify the work target.

The control unit 1 includes a display portion 11, an operation portion 12, a storage portion 13, and an interface portion 18. Further, the control unit 1 includes a controller including a CPU, a RAM, a ROM, and the like. For example, the controller may be a microcomputer, or similar computing device. For example, the CPU may include one or more integrated circuit chips. The controller functions as the acquiring portion 14, the process control portion 15, the receiving portion 16, and the registration portion 17 by executing the control program stored in the ROM. The RAM, ROM, and/or an external computer memory device may embody a non-transitory computer readable medium storing instructions, which when executed, cause the soldering apparatus 100 to perform the process described herein.

The display portion 11 displays an operation screen of the soldering apparatus 100. The display portion 11 may be a liquid crystal display or the like. The operation portion 12 allows the user to operate the operation screen. The operation portion 12 may be a touch panel, a keyboard or switches for inputting information, and the like.

The storage portion 13 stores various kinds of information used in the control unit 1. The storage portion 13 may be a storage device such as a memory, an HDD (Hard Disk Drive), an SSD (Solid State Drive), or the like. Other types of devices may be used for the storage portion 13.

Figure 4:
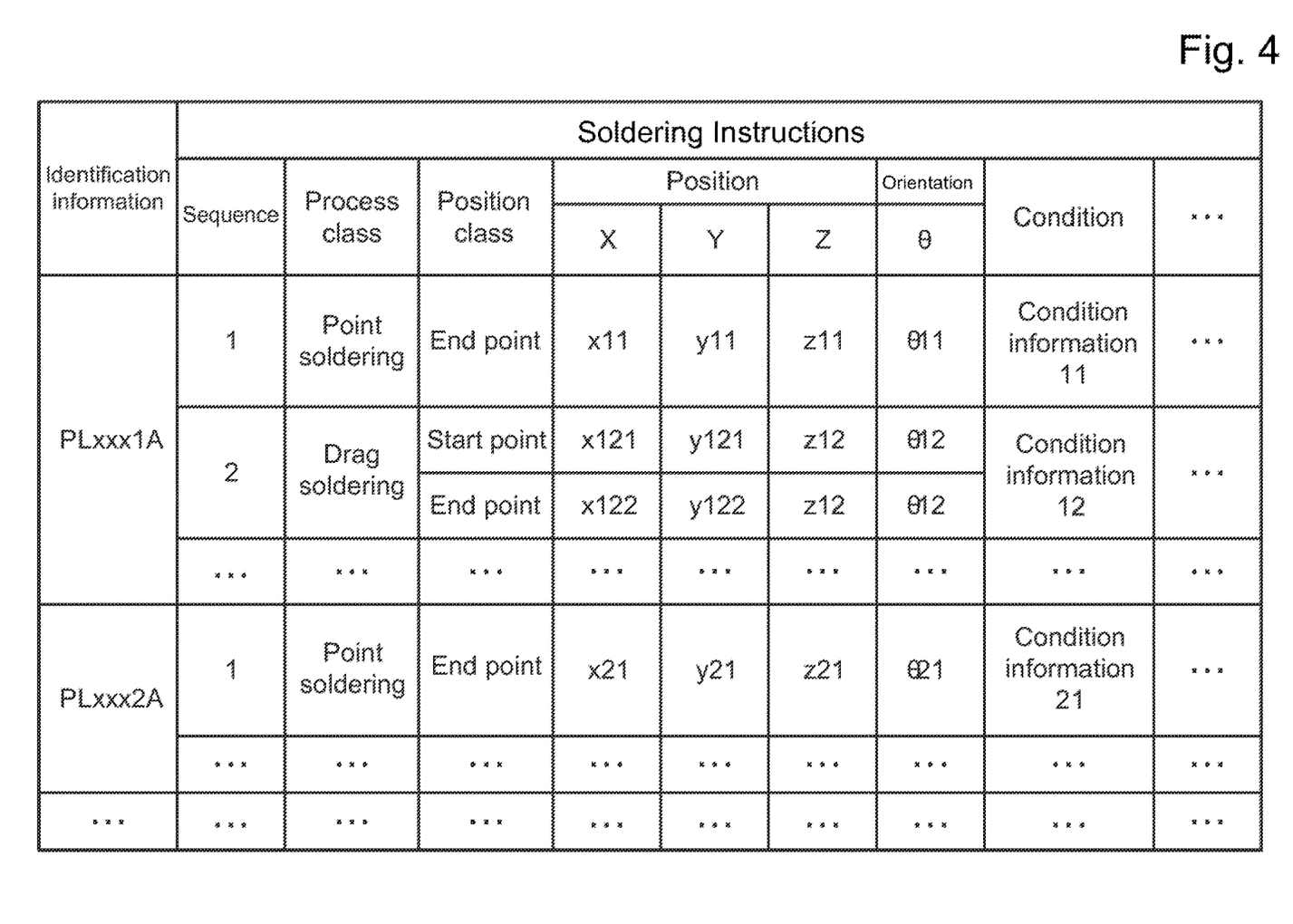
FIG. 4 is a diagram showing example soldering instructions stored in a storage portion.

FIG. 4 is a diagram showing an example of soldering instructions stored in the storage portion 13. The soldering instructions specify the parameters of soldering to be performed. As shown in FIG. 4, in the storage portion 13, soldering instructions for the printed wiring board PL are stored in association with the identification information (for example, "PLxxx 1 A") of the printed wiring board PL to be soldered.

The soldering instructions include one or more sequence information. The sequence information indicates the sequential order of soldering (example: 1, 2 . . . ) to be performed on the printed wiring board PL. The soldering instructions further include process class information, position class information, position information, orientation information, and condition information that represent the parameters of each soldering operation. The soldering operations are performed in the sequence indicated by the sequence information.

The process class information is information indicating whether to perform point soldering for forming a soldered point (referred to herein as "point soldering") or drawing a line segment of the solder SL (referred to herein as "drag soldering"). The process class information may be omitted from the soldering instructions, in which case either point soldering or drag soldering is performed for all operations.

The position class information is information indicating whether it is the start point or the end point when moving the tip 511 in order to form a point soldering or drag soldering.

For point soldering, it is necessary to end the movement of the tip 511 and to stop the tip 511 at the position of the point soldering forming target. Therefore, as shown in FIG. 4, when position class information indicates point soldering, the class information is automatically set as an end point. On the other hand, for drag soldering, it is necessary to move the tip 511 from a start point to an end point of a line segment that will be drawn with solder. Therefore, as shown in FIG. 4, when position class information indicates drag soldering, the position class information is automatically set as a start point and an end point.

The position information is information indicating a position to be soldered. More specifically, when position information indicates point soldering, the position information is the position on the three-dimensional coordinate where a point of solder is to be formed. In FIG. 4, coordinates (example: x11, y11, z11 in FIG. 4) indicating the position of a certain end point are included. On the other hand, when position information indicates drag soldering, the position information is for two coordinates indicating the positions of the start point and the end point of the line segment of the solder SL. In FIG. 4, coordinates (example: x121, y121, z12) represent a drag soldering start point, and other coordinates (example x122, y122, z12) represent a drag soldering end point.

The orientation information indicates the orientation (example: θ11, θ12 in FIG. 4) of the soldering iron 51. The orientation of the soldering iron 51 is an angle formed by the central axis of the soldering iron 51 in the θ direction with respect to the X-axis direction, as described above in connection with projection 5a of FIG. 3.

The condition information (example: condition information 11, and condition information 12) represents parameters for soldering to be performed. The parameters for point soldering include the number of times of soldering, the timing of soldering, and the supply amount of the solder SL. The parameters for drag soldering include the movement speed of the tip 511, the rotation speed of the soldering iron 51, and the supply amount of the solder SL.

The interface portion 18 communicates with an external device via a network. The interface portion 18 may be a communication interface circuit for allowing the soldering apparatus 100 to communicate with the external device via the network. For example, the external device may be a personal computer, a tablet terminal, a smartphone, or the like. The interface portion 18 may receive from the external device the target identification information of the printed wiring board PL, and/or the soldering instructions which specify parameters of soldering to be performed on the printed wiring board PL.

The acquiring portion 14 acquires, from the storage portion 13, the soldering instructions associated with identification information that matches the identification information that was read by the reading portion 6 from the printed wiring board PL.

The process control portion 15 controls the driving portion 4 so that the tip 511 moves to a position indicated by the position information included in the soldering instructions acquired by the acquiring portion 14. The soldering assembly 5 is controlled so that soldering is performed at the tip 511 of the soldering iron 51 according to the process class information and the condition information contained in the acquired soldering instructions.

The receiving portion 16 receives various operations (e.g., input entries) performed by the user using the operation portion 12. For example, the user may use the operation portion 12 to perform an operation of inputting soldering instructions for the printed wiring board PL to be worked and the identification information of the printed wiring board PL. When the user performs such an operation, the receiving portion 16 accepts the soldering instructions and identification information. In addition, the receiving portion 16 receives commands by the user (via the operation portion 12) for displaying various operation screens. When such commands are received, the receiving portion 16 displays the various operation screens on the display portion 11. Further, when the user causes the reading portion 6 to read the target identification information attached to the printed wiring board PL to be worked, the receiving portion 16 receives the target identification information that was read by reading portion 6.

The registration portion 17 stores in the storage portion 13 the data received by the receiving portion 16. Such data include the identification information and the soldering instructions that specify the parameters of soldering for the printed wiring board PL scheduled for work. The identification information is stored in association with the soldering instructions. Details for the receiving portion 16 and the registration portion 17 will be described later.

(Operation Flow)

The operation of the soldering apparatus 100 when soldering to the printed wiring board PL will now be described.

Figure 5:
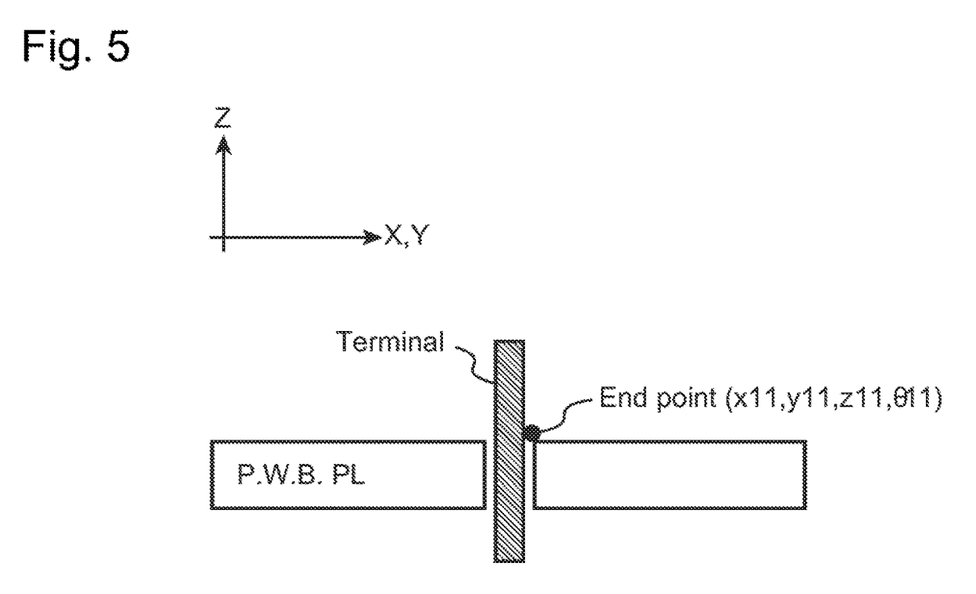
FIG. 5 is a view showing an example of a position where point soldering is performed.
Figure 6:
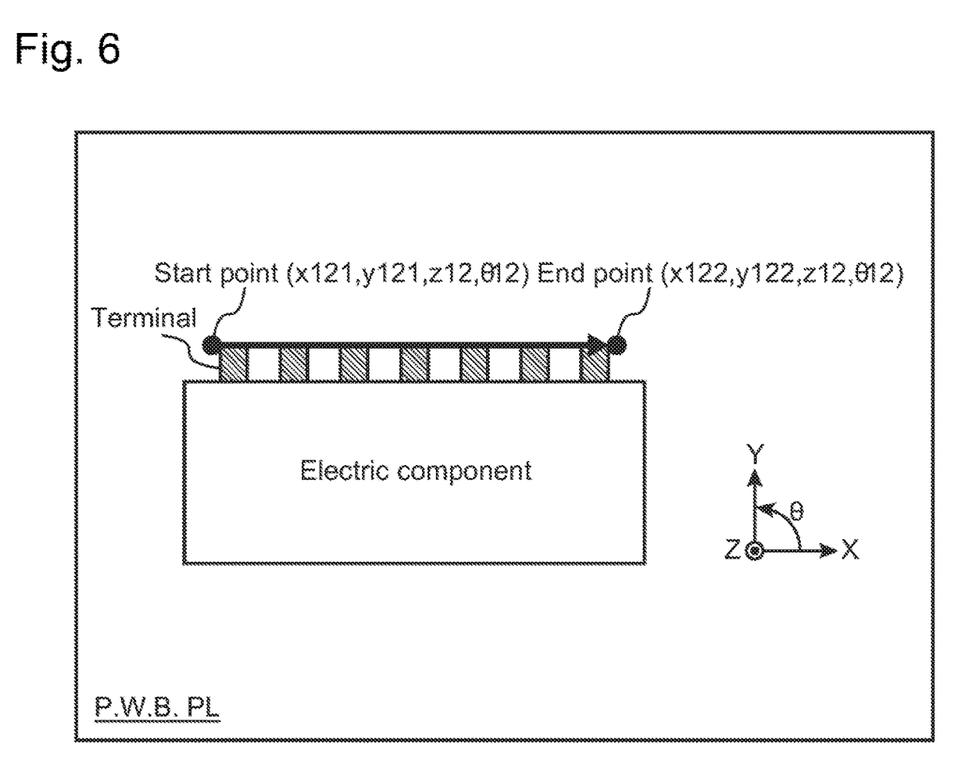
FIG. 6 is a diagram showing an example of a position where drag soldering is performed.
Figure 7:
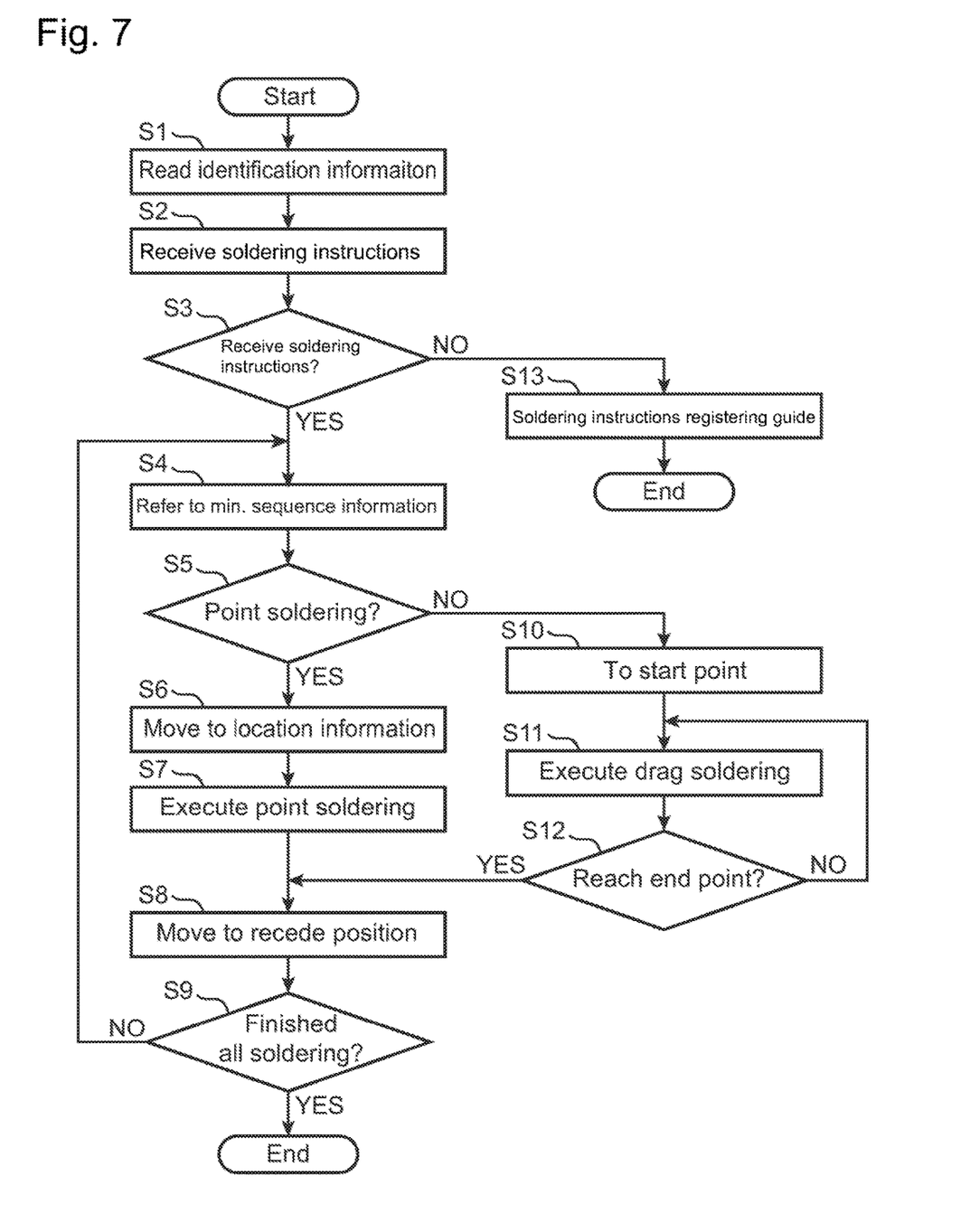
FIG. 7 is a flowchart showing an example soldering process performed using a soldering apparatus.

FIG. 5 is a diagram showing an example of a position where point soldering is performed. Point soldering is performed on a soldering target on the work target (printed wiring board PL). The soldering target is a terminal in the illustrated example. FIG. 6 is a diagram showing an example of a position where drag soldering is performed. Drag soldering is performed on a soldering target on the work target (printed wiring board PL). The soldering target comprises a plurality of terminals of an electric component in the illustrated example. FIG. 7 is a flowchart showing an example process performed by the soldering apparatus 100.

FIG. 5 shows the position information indicating the position to be soldered in the sequence "1" of soldering instructions associated with the identification information "PLxxx1A" shown in FIG. 4. The orientation information indicates the orientation of the soldering iron 51 as being θ11. As illustrated in FIG. 5, the position information is a combination of information "x11, y11, z11, θ11." FIG. 6 shows combinations of position information "x121, y121, z12, θ12" and "x122, y122, z12, θ12", which indicate the position of soldering in the sequence "2" shown in FIG. 4. The orientation information indicates the orientation of the soldering iron 51 as being θ12.

First, prior to the operation shown in FIG. 7, the process control portion 15 controls the coil heater to heat the tip 511 (FIG. 3) to a predetermined temperature at which the solder SL can be melted. As described above, the coil heater is incorporated in the integrated tip heater type assembly inserted in the main body 512 (FIG. 3) of the soldering iron 51.

As shown in FIG. 7, identification information of the printed wiring board PL is read by the reading portion 6 (step S1). Next, the acquiring portion 14 searches the storage portion 13 for identification information that matches the target identification information that was read in step S1. If there is a match, the acquiring portion 14 acquires the soldering instructions associated with the matching identification information (step S2).

It is possible that there is no match. That is, it is possible that the storage portion 13 does not store any soldering instructions corresponding to the target identification information read in step S1, and so the acquiring portion 14 fails to acquire any soldering instructions in step S2. In this case (step S3: NO), the process control portion 15 displays on the display portion 11 a screen that instructs the user how to enter soldering instructions (step S13) and then terminates the process.

When the acquiring portion 14 has acquired the soldering instructions in step S2 (step S3: YES), the process control portion 15 determines the lowest sequence number in the soldering instructions which has not been performed (step S4). For example, the soldering instructions may have two soldering operations, none of which have been performed, and which start with sequence "1" and ends with sequence "2." In this example, "1" is the lowest sequence number which has not been performed, and this number identifies the current soldering operation.

The process control portion 15 refers to the process class information associated with the current soldering operation and determines whether the process class information indicates point soldering (step S5).

When the process class information indicates point soldering (step S5: YES), the process control portion 15 determines that the current soldering operation is point soldering. On the other hand, when the process class information indicates drag soldering (step S5: NO), the process control portion 15 determines that the current soldering operation is drag soldering.

When YES at step 5, the process control portion 15 controls the driving portion 4 to move the soldering iron 51 in accordance with the position information and the orientation information associated with the current soldering operation (step S6).

For example, in step S2, the acquiring portion 14 may acquire soldering instructions associated with the identification information "PLxxx1A" of the printed wiring board PL shown in FIG. 4. Thus, in step S4, it is determined that sequence information "1" is the lowest sequence number which has not been performed. Sequence information "1" identifies the current soldering operation. Next, in step S5, the process control portion 15 refers to the position information "x11, y11, z11" and the orientation information "θ11" associated with the sequence information "1." Then, the process control portion 15 controls the first driving portion 41, the second driving portion 42, and the third driving portion 43 so that the tip 511 moves to the position of the X, Y and Z coordinates "x11, y11, z11." Further, the process control portion 15 controls the fourth driving portion 44 so that the orientation of the soldering iron 51 becomes the angle "θ11."

Since the process class information for the current soldering operation indicates point soldering (see FIG. 4), the process control portion 15 controls the soldering assembly 5 so that point soldering is performed at the tip 511. Point soldering is performed according to the soldering conditions indicated by the condition information for the current soldering operation (step S7).

When the point soldering in step S7 is finished, the process control portion 15 controls the driving portion 4 so that the tip 511 moves to a predetermined recede position (step S8).

The recede position is such that the Z coordinate of tip 511 is increased by a predetermined value "z0" (which is greater than zero) from the end point, which is where the tip 511 is currently located. Optionally, the X and Y coordinates of tip 511 are adjusted according to predetermined values "x0" and "y0," respectively. Values for "x0" and "y0" may be less than zero (negative), zero, or greater than zero (positive). For example, when the coordinates of the end point position are "x11, y11, z11", then the recede position will be "x11, y11, z11+z0" or "x11+x0, y11+y0, z11+z0" and the like.

After step S8, the system checks whether all soldering operations have been completed. If not (step S9: NO), the process control portion 15 repeats the processes by returning to step S4. On the other hand, after the step S8, if all the soldering operations have been completed (step S9: YES), the process control portion 15 ends the process.

Referring again to step S5, if the process control portion 15 determines that the current soldering operation is drag soldering (step S5: NO), the process control portion 15 controls the driving portion 4 so that the soldering iron 51 moves according to the position information and the orientation information for the start point associated with the current soldering operation (step S10).

For example, in step S2, the acquiring portion 14 may acquire soldering instructions associated with the identification information "PLxxx1A" of the printed wiring board PL shown in FIG. 4. Also, "2" may now be the lowest sequence number which has not been performed. In this case, in step S10, the process control portion 15 selects position and orientation information for the start point of sequence information "2." Such information is selected from all other information in the storage portion 13. Specifically, control portion 15 selects position information "x121, y121, z12" and orientation information "θ12."

Then, the process control portion 15 controls the first driving portion 41, the second driving portion 41, and the third driving portion 43 so that the tip 511 moves to a position according to the selected position information "x121, y121, z12." Further, the process control portion 15 controls the fourth driving portion 44 so that the soldering iron 51 becomes oriented according to selected orientation information "θ12."

Next, the process control portion 15 will move the soldering iron 51 to conduct drag soldering (step S11).

We continue from step S10 with the example above for sequence information "2," which identifies the current soldering operation for identification information "PLxxx1A." In step S11, the process control portion 15 refers to the condition information, namely "condition information 12," which is associated with the sequence information "2," which is for drag soldering. Accordingly, "condition information 12" includes the movement speed of the tip 511 and the rotation speed of the soldering iron 51 for performing drag soldering.

Then, the process control portion 15 selects the position information and the orientation information associated with the "end point" for sequence information "2." The information is selected from among all other information in the storage portion 13. Specifically, the control portion 15 select position information "x122, y122, z12" and orientation information "θ12."

The process control portion 15 reads the position information position "x121, y121, z12" for the start point and the position information "x122, y122, z12" for the end point, and uses that information to control the first driving portion 41, the second driving portion 42, and the third driving portion 43 so that the tip 511 linearly moves from the start point to the end point at the movement speed specified by the "condition information 12." Further, the process control portion 15 controls the fourth driving portion 44 so that the soldering iron 51 moves to an orientation specified by orientation information "θ12" where such movement is performed according to the rotation speed specified by "condition information 12".

However, in the above specific example, the Z coordinate "z12" at the start point and the Z coordinate "z12" at the end point are the same. Also, the angle "θ12" for the start point is the same as the angle "θ12" for the end point. Therefore, in step S11, the control of the third driving portion 43 and the fourth driving portion 44 maintains (does not change) the Z coordinate of the tip 511 and the orientation of the soldering iron 51.

Simultaneously with the control of the first driving portion 41, the second driving portion 42, the third driving portion 43, and the fourth driving portion 44, the process control portion 15 sets the conditions associated with the current soldering operation (which is sequence information "2" in this example). The soldering assembly 5 is controlled so that drag soldering is performed with the tip 511 according to the soldering conditions (for example, supply amount of the solder SL) indicated by the information.

As long as the tip 511 has not reached the end point (step S12: NO), the process control portion 15 continues the soldering at step S11. When the tip 511 reaches the end point (step S12: YES), the process control portion 15 ends the control of the soldering assembly 5 and the driving portion 4 and terminates the drag soldering. Upon termination of the drag soldering, the process control portion 15 performs the process described above for step S8 and then checks whether all soldering operations are completed at step S9.

Since the identification information accompanying the work target (a particular wiring board, for example) is read directly from the work target, the acquiring portion 14 avoids acquiring soldering instructions that are not for the work target. Thereby, it is possible to prevent the tip 511 of the soldering iron 51 from being moved to an incorrect soldering position on the printed wiring board PL. This helps to ensure that soldering is always performed at the correct position on the printed wiring board PL.

(Editing Soldering Instructions)

Figure 8:
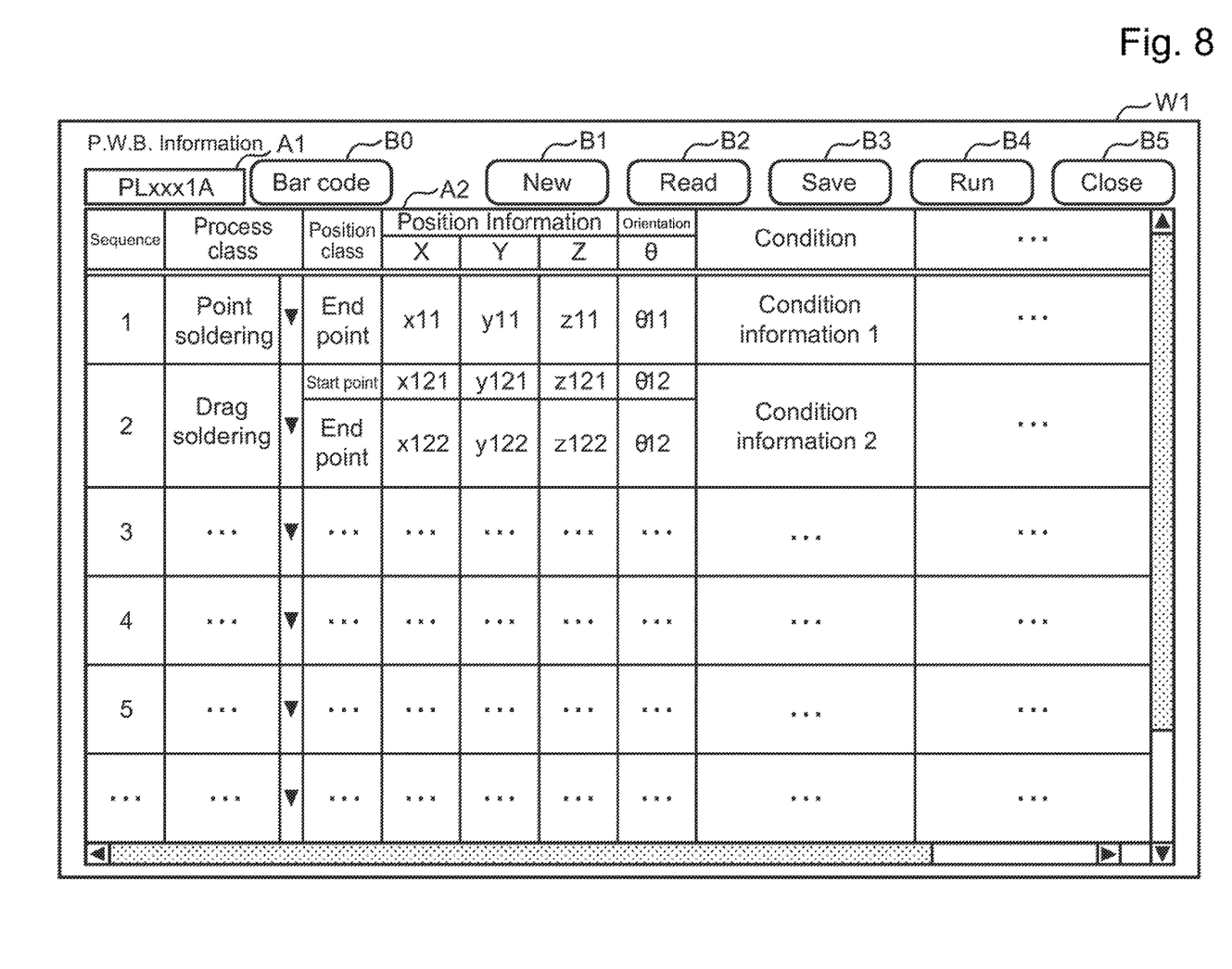
FIG. 8 is a diagram showing an example editing operation screen for editing soldering instructions.

Next, a method of editing the soldering instructions and storing them in the storage portion 13 will be described. Details of the receiving portion 16 and the receiving portion 17 will be described. FIG. 8 is a diagram showing an example of the soldering instructions edit operation screen W1. When a predetermined operation for starting the editing of the soldering instructions is performed by the user using the operation portion 12, the receiving portion 16 displays the editing operation screen W1 of FIG. 8 on the display portion 11, for example.

As shown in FIG. 8, the editing operation screen W1 includes an edit field A1, an editing area A2, and six soft keys B0 to B5.

The edit field A1 allows the user to edit the identification information (example: "PLxxx1A") of a printed wiring board. In the edit field A1, the identification information may be edited manually by the operation of the operation portion 12 by the user. In addition, in the edit field A1, it is possible to input identification information using the reading portion 6.

Specifically, when the user presses the soft key B0 by operating the operation portion 12, the receiving portion 16 displays on the display portion 11 a screen (not shown) that instructs the user on how to use the reading portion 6 to read the target identification information D on the printed wiring board PL. When the user causes the reading portion 6 to read the target identification information, the receiving portion 16 inputs the target identification information read by the reading portion 6 into the edit field A1. Then, the receiving portion 16 sets the inputted target identification information in a state of being uneditable in the edit field A1. The edit field A1 may be displayed as gray to indicate that the target identification information is uneditable (cannot be edited). The use of the reading portion 6 makes it possible to input more accurate identification information into the edit field A1 compared to manual entry by the user.

The editing area A2 allows the user to edit soldering instructions for the printed wiring board identified in the edit field A1. The editing area A2 includes sequence display fields, process class selection fields, position class display fields, position information edit fields, orientation edit fields, and condition edit fields. These fields (illustrated as individual boxes) are arranged in columns, and the columns are arranged beginning from the left in FIG. 8.

In the sequence display field, the sequential order of soldering (for example, 1, 2, 3 . . . ) for the printed wiring board is displayed.

In each process class selection field, process class information is edited by the user to be either point soldering or drag soldering. Specifically, in the process class selection field, selection is made as to whether to perform point soldering or perform drag soldering.

In the position class display field, position class information is displayed as either an end point or start point. Specifically, when the user selects point soldering in the process class selection field, the receiving portion 16 displays "end point" in the corresponding position class display field. When the user selects drag soldering in the process class selection field, the receiving portion 16 displays "start point" and "end point" in the corresponding position class display fields. Corresponding position class display fields are located horizontally to the right of the process class selection field.

In the position information editing fields, editing of position information is performed by the user. Specifically, in the position information editing fields, the coordinate information on the three-dimensional coordinate is edited by the user as the position information for corresponding process class selection fields. Corresponding process class selection fields are located horizontally to the left of the position information editing fields. For example, in the position information edit field corresponding to the process class selection field which indicates point soldering, coordinate information (example: x11, y11, z11) representing an end point is edited. On the other hand, if the process class selection field indicates drag soldering, coordinate information (example: x121, y121, z12) indicating the start point and coordinate information (example: x122, y122, z12) are edited.

In the orientation edit fields, editing of orientation information is performed by the user. Specifically, in the orientation edit fields, the user may edit an angle representing the orientation of the soldering iron 51 at each of the start point and the end point for corresponding process class selection fields. Corresponding process class selection fields are located horizontally to the left of the orientation edit fields. For example, in the orientation edit field corresponding to a process class selection field indicating point soldering, the user may edit an angle (for example, θ11) indicating the orientation of the soldering iron 51 at an end point. On the other hand, in the orientation edit fields corresponding to a process class selection field indicating drag soldering, the user may edit an angle (example: θ12) indicating the orientation of the soldering iron 51 at a start point and an angle (example: θ12) indicating the orientation of the soldering iron 51 at an end point.

In the condition editing fields, editing of the condition information is performed by the user. Specifically, when a condition editing field is clicked by the user, the receiving portion 16 displays a condition editing screen (not shown). On the condition editing screen, the user may edit the following parameters for point soldering: the number of times of soldering, the timing of soldering, and the supply amount of the solder SL. On the condition editing screen, the user may edit the following parameters for drag soldering: the moving speed of the tip 511, the rotational speed of the soldering iron 51, and the supply amount of solder SL.

The soft key B1 is for entering new soldering instructions. When the soft key B1 is clicked by the user, the receiving portion 16 deletes (clears) all the information that may already be present in edit field A1 and editing area A2. As a result, the user may enter new soldering instructions in the editing operation screen W1.

The soft key B2 is importing soldering instructions stored in the storage portion 13 to the editing operation screen W1. When the soft key B2 is clicked by the user, the receiving portion 16 displays a selection screen that allows the user to select soldering instructions that were previously stored in the storage portion 13 for a particular printed wiring board. The selection screen may display a list of identification information for many printed wiring boards from which the user may make a selection. When desired identification information is selected on the selection screen, the receiving portion 16 reads out the soldering instructions associated with the selected identification information from the storage portion 13, and imports the soldering instructions to the editing operation screen W1. As a result, it is possible to re-edit the soldering instructions that have been stored in the storage portion 13.

The soft key B3 is a soft key for storing, in the storage portion 13, the identification information present in the edit field A1 and the soldering instructions present in the editing area A2. When the soft key B3 is clicked by the user, the receiving portion 16 receives the identification information and the soldering instructions, and then the registration portion 17 stores the received data into the storage portion 13. The received soldering instructions are stored in association with the received identification information.

The soft key B4 is executing the soldering instructions displayed in the editing area A2. When the soft key B4 is clicked by the user, the receiving portion 16 receives the displayed soldering instructions. Using the received soldering instructions, the process control portion 15 executes the soldering instructions according to steps S4 and onward of FIG. 7. This makes it possible for the user to confirm that there is no problem with the soldering instructions displayed on the editing operation screen W1.

The soft key B5 is for closing the edit operation screen W1. When the soft key B5 is clicked by the user, the receiving portion 16 hides (or closes) the editing operation screen W1.

(Modifications)

The above descriptions are not intended to be limiting. The following modifications may be implemented.

(1) The receiving portion 16 may not display the edit operation screen W1. In this case, the interface portion 18 may receive identification information and soldering instructions from an external device via the network. When such data is received by the interface portion 18, the registration portion 17 stores the received data in the storage portion 13. The received soldering instructions are stored in association with the received identification information. Alternatively, the storage portion 13 may be configured with a storage device, such as a USB memory, in which identification information of the printed wiring board PL and soldering instructions are stored in advance in association with each other.

(2) The reading portion 6 is not limited to a configuration that is freely movable by the user, but may be configured to be fixed at a predetermined position of a soldering work site.

(3) The teaching information may include only the sequence information and the position information. In accordance with this, it is assumed that the process control portion 15 indicates that the process class information performs point soldering, the position class information indicates the end point, the direction information indicates a predetermined angle, and the condition information is predetermined condition of the soldering, it may be configured so that only point soldering can be performed at the position indicated by the position information in the sequence indicated by the sequence information.

(4) Different target identification information for identifying the respective surfaces may be adhered or printed on opposite sides of the printed wiring board PL. In accordance with this, different soldering instructions may be stored in the storage portion 13 in association with identification information of each surface of the printed wiring board PL. In this case, according to the different soldering instructions, soldering can be performed at a position suitable for each surface of the printed wiring board PL.

(5) The soldering instructions may further include target class information identifying a work target surface of the printed wiring board PL as either being a front surface or a back surface. Then, one or more pieces of sequence information (for example, sequence information "1" and "2") may be associated with the front surface, and one or more pieces of sequence information (for example, sequence information "3" and "4") may be associated with the back surface.

In this case, the process control portion 15 executes the soldering instructions according to Steps S4 and onward of FIG. 7 for the sequence information associated with the front surface. After those soldering instructions are executed (step S9: YES), the process control portion 15 may wait for an instruction from the user to solder the back surface. When the user inputs an instruction to solder the back surface, the process control portion 15 executes the soldering instructions according to Steps S4 and onward of FIG. 7 for the sequence information associated with the back surface.

(6) In the descriptions, the work target is the printed wiring board PL, but the work target is not limited to this, and may be, for example, a harness, a terminal, or the like.

LIST OF REFERENCE NUMERALS

1 control unit
11 display portion
12 operation portion
13 storage portion
14 acquiring portion
15 process control portion
16 receiving portion
17 registration portion
18 interface portion
4 Driving portion
41 first driving portion
42 second driving portion
43 third driving portion
44 fourth driving portion
5 soldering assembly
50 base
51 soldering iron
52 solder supply mechanism
512 main body
6 reading portion
60 bar code reader
100 Soldering apparatus
D bar code
PL printed wiring board (work target)
SL solder
W1 edit operation screen While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A soldering apparatus comprising:
    a soldering iron comprising a soldering tip for soldering,
    a driving portion that moves the soldering iron relative to a work target,
    a storage portion,
    a reading portion,
    an acquiring portion, and
    a process control portion, wherein the soldering apparatus performs a method comprising:
    storing, by the storage portion, position information indicating a position for soldering and identification information, the position information and the identification information stored in association with each other;
    storing, by the storage portion, condition information indicating parameters of the soldering to be performed at the position indicated by the position information, the condition information being stored in association with the position information;
    reading, by the reading portion, target identification information disposed on the work target, the target identification information being read by the reading portion after the position information and the identification information are stored by the storage portion;
    matching, by the acquiring portion in communication with the storage portion, the target identification information read by the reading portion to the identification information stored in the storage portion, and acquiring from the storage portion the position information associated with the identification information that was matched to the target identification information;
    acquiring, by the acquiring portion from the storage portion before the soldering is performed, the condition information associated with the acquired position information; and
    controlling, by the process control portion in communication with the driving portion and the soldering iron, the driving portion and the soldering iron so that soldering is performed at the position indicated by the position information acquired by the acquiring portion and so as to perform the soldering according to the parameters indicated by the condition information acquired by the acquiring portion, the soldering performed at the position indicated by the position information acquired by the acquiring portion.

2. The soldering apparatus according to claim 1, wherein the reading portion is configured to be freely movable by a user relative to the work target.

3. The soldering apparatus according to claim 1, wherein the identification information is represented by a barcode.

4. The soldering apparatus according to claim 1, wherein the identification information is represented by a two-dimensional code.

5. The soldering apparatus according to claim 1, wherein the apparatus further comprises a receiving portion and a registration portion, wherein the method further comprises:
    receiving, by the receiving portion, the position information and the identification information before the position information and the identification information are stored in the storage portion; and
    instructing, by the registration portion, the storage portion to store the received identification information and the received position information in association with each other in the storage portion.

6. The soldering apparatus according to claim 5, wherein the receiving portion receives, as the identification information to be stored in the storage portion, the target identification information that was read by the reading portion.

7. A non-transitory computer readable medium for a soldering apparatus comprising a soldering iron, a driving portion, a storage portion, a reading portion, and a controller, the non-transitory computer readable medium storing instructions, which when executed by the controller of the soldering apparatus, causes the soldering apparatus to perform a soldering method comprising:

storing, in the storage portion, position information indicating a position for soldering and identification information, the position information and the identification information stored in association with each other;

storing, by the storage portion, condition information indicating parameters of the soldering to be performed at the position indicated by the position information, the condition information being stored in association with the position information;

reading, by the reading portion, target identification information disposed on a work target, the reading performed after the position information and the identification information are stored in the storage portion;

matching, by the controller, the target identification information read by the reading portion to the identification information stored in the storage portion;

acquiring, by the controller, the position information stored in the storage portion in association with the identification information that was matched to the target identification information;

acquiring, from the storage portion before the soldering is performed, the condition information associated with the acquired position information, the acquiring performed by the controller; and controlling, by the controller, the driving portion and the soldering iron so that soldering is performed at the position indicated by the acquired position information and so as to perform the soldering according to the parameters indicated by the acquired condition information, the soldering performed at the position indicated by the acquired position information.

8. The non-transitory computer readable medium of claim 7, wherein the soldering method performed by the soldering apparatus further comprises:

receiving, by the controller, the position information and the identification information before the position information and the identification information are stored in the storage portion; and instructing, by the controller, the storage portion to store the received identification information and the received position information in association with each other in the storage portion.

9. The non-transitory computer readable medium of claim 8, wherein the controller receives, as the identification information to be stored in the storage portion, the target identification information that was read by the reading portion.

10. A soldering method for a soldering apparatus comprising a soldering iron, a driving portion, a storage portion, a reading portion, and a controller, the soldering method comprising:

storing, in the storage portion, position information indicating a position for soldering and identification information, the position information and the identification information stored in association with each other;

storing, by the storage portion, condition information indicating parameters of the soldering to be performed at the position indicated by the position information, the condition information being stored in association with the position information;

reading, by the reading portion, target identification information disposed on a work target, the reading performed after the position information and the identification information are stored in the storage portion;

matching, by the controller, the target identification information read by the reading portion to the identification information stored in the storage portion;

acquiring, by the controller, the position information stored in the storage portion in association with the identification information that was matched to the target identification information;

acquiring, from the storage portion before the soldering is performed, the condition information associated with the acquired position information, the acquiring performed by the controller; and controlling, by the controller, the driving portion and the soldering iron so that soldering is performed at the position indicated by the acquired position information and so as to perform the soldering according to the parameters indicated by the acquired condition information, the soldering performed at the position indicated by the acquired position information.

11. The soldering method of claim 10, further comprising:

receiving, by the controller, the position information and the identification information before the position information and the identification information are stored in the storage portion; and instructing, by the controller, the storage portion to store the received identification information and the received position information in association with each other in the storage portion.

12. The soldering method of claim 11, wherein the controller receives, as the identification information to be stored in the storage portion, the target identification information that was read by the reading portion.

* * * * *